March 21, 1950  E. R. SLATER  2,501,103
FISH LURE
Filed Feb. 11, 1947
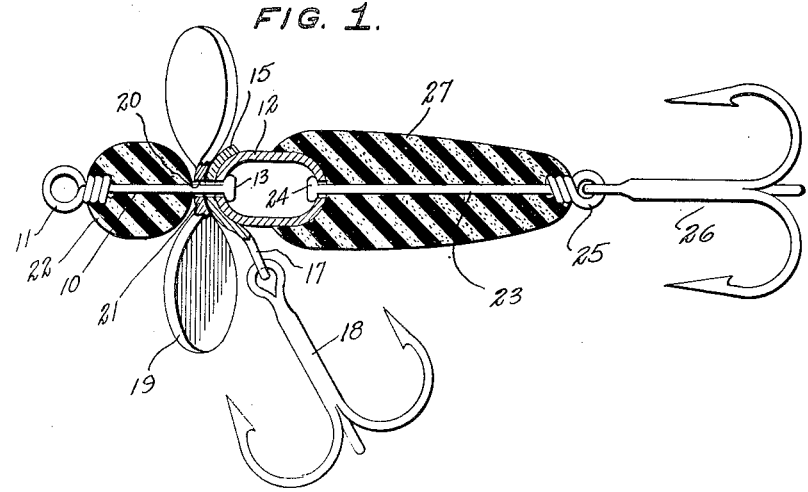
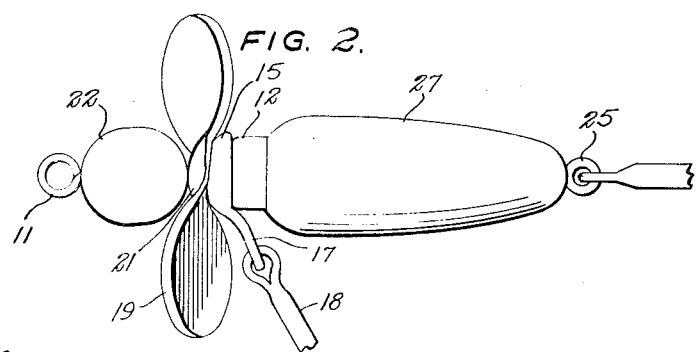
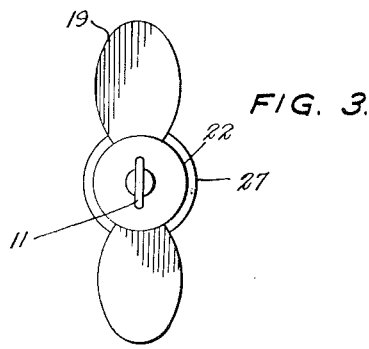
EUGENE R. SLATER, Inventor Patented Mar. 21, 1950

2,501,103

UNITED STATES PATENT OFFICE 2,501,103

FISH LURE

Eugene R. Slater, Oil City, Pa.

Application February 11, 1947, Serial No. 727,862

4 Claims. (Cl. 43—42.15)

My invention relates to artificial fish lures, and more particularly to a lure of the spinner type.

The object of my invention is to provide a fish lure of the character indicated above partially formed of sponge rubber to give the impression of a live or animated minnow instead of an artificial minnow.

A further object of the invention is to divide the body of the artificial lure into a plurality of parts joined together so that each part is adapted to move relatively to the adjoining part.

Another object of my invention is to provide an artificial lure of the character indicated above having swivel connections between adjoining parts preventing any twisting action of the lure through the action of the water on any other part of the lure.

It is, however, to be understood that my invention is not to be limited or restricted to the exact construction and combination of parts described in the specification and shown in the drawings, but that such changes and modifications can be made which fall within the scope of the claims appended hereto.

In the drawings:

Figure 1 is a longitudinal sectional view of the lure according to my invention taken on a vertical center plane of said lure.

Figure 2 is a fragmentary elevational side view of the lure shown in Figure 1.

Figure 3 is a front view of the lure shown in Figure 2.

Figure 4 is a detail front view of a link member used to connect a fish hook to the lure according to my invention.

Referring now in detail to the drawings, the illustrated fish lure comprises a forward wire member 10 on the forward end of which an eye 11 is formed. The rear end of the forward wire member 10 extends through the forward end of a hollow oval swivel member 12 and is rotatably secured therein by an enlargement 13 of the rear end of the wire member 10.

In front of the hollow swivel member 12 a link member 14 is loosely mounted on the wire member 10. The link 14 has a bowl-shaped portion 15 in the center of which a hole 16 is to freely pass the wire member 10 therethrough. The shape of the portion 15 is such that it fits onto the forward end of the hollow swivel member 12.

On the bowl-shaped portion 15 a ring-shaped lug 17 is formed adapted to support and hold a fish hook 18 which has preferably three barbed points.

In front of the link member 14 a propeller-like spinner 19 is loosely mounted on the wire member 10 which extends through a hole 20 in the hub portion 21 of the spinner 19. This hole 20 is so much bigger than the wire member 10 that the propeller will not only be able to rotate about the wire member but can have a swaying and shifting movement on said wire member.

The length of the wire member 10 between the hub 21 of the spinner 19 and the eye 11 on the forward end of the wire member is surrounded by a globe 22 of sponge rubber.

A rearwardly extending wire member 23 extends through the rear end of the hollow swivel member 12 and is rotatably secured therein by an enlargement 24. The rearward wire member 23 is substantially longer than the forward wire member 10 and on the rear end of the rearward wire member 23 an eye 25 is formed.

A fish hook 26 similar to the above-mentioned fish hook 18 is loosely secured in the eye 25. The rearward wire member 23 and the rearward portion of the hollow swivel member 12 are covered by a body of sponge rubber 27 having an elongated shape of circular cross-section so that the appearance of the assembled lure will give the impression of a minnow or the like.

When the above-described lure is to be used, it is fastened to a fish line (not shown) attached to the forward eye 11. When the lure is moved or pulled through the water, the spinner 19 will rotate about the forward wire member 10 with the body or head 27 rotating only axially of the swivel member 12, thereby resulting in the whole rear portion of the lure giving the impression of being a portion of a live or animated minnow. The ring shaped lug 17 carried by the bowl shaped portion 15 of the link 14 supports the forward hook 18 with sufficient clearance from the spinner 19 so that when a trout or other game fish strikes the hook there will be no interference by the spinner during the hooking of the fish on such hook. If a fish comes in contact with the forward or the rearward portion of the body of the lure, the soft sponge rubber will give the impression of a live minnow and will not scare the fish away.

The sponge rubber masses 22 and 27 can be of any desired color, but are preferably black.

Having described my invention, I claim as new and desire to secure by Letters Patent:

1. An artificial minnow comprising a main body section formed of sponge rubber in an elongated generally cylindrical form simulating in shape and impression the body of a live minnow, a hollow bearing on the forward end of said main body section terminating in a rounded forward end, a rod projecting forwardly from the forward end of said bearing having its rear end loosely secured to rotate axially in the forward end of said bearing, a globular head section of sponge rubber fixed on said rod in forwardly spaced relation to the rounded forward end of said bearing to simulate the shape and impression of the head of a live minnow, a propeller spinner axially and loosely journalled on said rod between the rear end of said head section and the forward end of said bearing and free to rotate on and tilt relative to said rod, a dished hook attaching link positioned between said spinner and the rounded forward end of said bearing, said dished link being formed with a central opening loosely encompassing said rod whereby said link is free to rotate and tilt on said rod, said link having a lateral eye to which a fish hook is adapted to be secured, another fish hook attaching eye on the rear end of said main body section, and a line attaching eye on the forward end of said rod.

2. A fish lure of the spinner type comprising a hollow oval swivel member provided in its forward and in its rearward ends with coaxially aligned holes, a wire member carrying a forward body portion having one end loosely extending through the forward hole in the swivel member, a rearward body portion arranged in alignment with the rearward hole in the swivel member and secured to the latter member, an enlargement on the end of said wire member extending through the forward hole in the swivel member and within the latter member for rotatably securing the wire member to the swivel member, an eye formed on the other end of said wire member, a propeller like spinner rotatably mounted on the wire member in front of the swivel member, a link embodying a bowl shaped portion and a ring shaped lug depending from said portion, the bowl shaped portion of said link being mounted on said wire member between the swivel member and the spinner, and a fish hook secured to said lug.

3. A fish lure of the spinner type comprising a hollow oval swivel member provided in its forward and in its rearward ends with coaxially aligned holes, a wire member carrying a forward body portion having one end loosely extending through the forward hole in the swivel member, a rearward body portion arranged in alignment with the rearward hole in the swivel member and secured to the latter member, an enlargement on the end of said wire member extending through the forward hole in the swivel member and within the latter member for rotatably securing the wire member to the swivel member, an eye formed on the other end of said wire member, a propeller like spinner rotatably mounted on the wire member in front of the swivel member, a link embodying a bowl shaped portion and a ring shaped lug depending from said portion, the bowl shaped portion of said link being mounted on said wire member between the swivel member and the spinner, and a fish hook secured to said lug, said forward body portion being of sponge rubber and mounted on and surrounding the portion of said wire member between the eye and the spinner.

4. A fish lure of the spinner type comprising a hollow oval swivel member provided in its forward and in its rearward ends with coaxially aligned holes, a wire member carrying a forward body portion having one end loosely extending through the forward hole in the swivel member, a rearward body portion arranged in alignment with the rearward hole in the swivel member and secured to the latter member, an enlargement on the end of said wire member extending through the forward hole in the swivel member and within the latter member for rotatably securing the wire member to the swivel member, an eye formed on the other end of said wire member, a propeller like spinner rotatably mounted on the wire member in front of the swivel member, a link embodying a bowl shaped portion and a ring shaped lug depending from said portion, the bowl shaped portion of said link being mounted on said wire member between the swivel member and the spinner, and a fish hook secured to said lug, said forward body portion being of sponge rubber and mounted on and surrounding the portion of said wire member between the eye and the spinner, the rearward body portion comprising a second wire member extending loosely through the rearward hole in the swivel member and having an enlarged forward end inside the swivel member securing said second wire member to said swivel member, an eye formed on the rear end of the second wire member, a fish hook secured to the last named eye, and an elongated body of sponge rubber covering the second wire member between the last mentioned eye and the rear portion of the swivel member.

EUGENE R. SLATER.

REFERENCES CITED

The following references are of record in the file of this patent:

UNITED STATES PATENTS

| Number | Name | Date |
|---|---|---|
| 586,620 | Osborn | July 20, 1897 |
| 667,257 | Shakespeare, Jr., et al. | Feb. 5, 1901 |
| 671,613 | Shakespeare | Apr. 9, 1901 |
| 1,292,865 | Olt | Jan. 28, 1919 |
| 1,297,354 | Jay | Mar. 18, 1919 |
| 1,585,943 | Streich | May 25, 1926 |
| 1,618,083 | Heimburge | Feb. 15, 1927 |
| 1,846,538 | Albers et al. | Feb. 23, 1932 |